(12) United States Patent
DeHart

(10) Patent No.: US 7,197,811 B2
(45) Date of Patent: Apr. 3, 2007

(54) METHOD FOR SEPARATING STATOR WINDINGS OF AN ELECTRIC MOTOR DURING MANUFACTURE

(75) Inventor: Hobart DeHart, Austin, IN (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 146 days.

(21) Appl. No.: 10/781,127

(22) Filed: Feb. 18, 2004

(65) Prior Publication Data

US 2004/0163231 A1    Aug. 26, 2004

Related U.S. Application Data

(62) Division of application No. 09/967,364, filed on Sep. 28, 2001, now Pat. No. 6,722,016.

(51) Int. Cl.
*H02K 15/00* (2006.01)
(52) U.S. Cl. .......................... 29/596; 29/564.5; 29/605; 29/606; 29/732; 29/734; 29/735; 29/736; 29/760; 29/762; 310/42; 310/71
(58) Field of Classification Search ............... 29/596, 29/564.5, 605, 606, 732, 734, 735, 736, 760, 29/762; 310/71
See application file for complete search history.

(56) References Cited

U.S. PATENT DOCUMENTS

| | | | |
|---|---|---|---|
| 3,672,041 A | 6/1972 | Arnold | 29/596 |
| 3,815,206 A | 6/1974 | Smith | 29/205 D |
| 4,544,856 A | 10/1985 | King | 310/71 |
| 4,648,176 A | 3/1987 | Moser | 29/596 |
| 4,750,258 A * | 6/1988 | Anderson | 29/596 |
| 4,829,649 A | 5/1989 | Tribot | 29/596 |
| 5,485,670 A | 1/1996 | Bouman et al. | 29/732 |
| 5,802,706 A * | 9/1998 | Barrett | 29/736 |

FOREIGN PATENT DOCUMENTS

JP    2000152564 A    11/1998

* cited by examiner

*Primary Examiner*—A. Dexter Tugbang
*Assistant Examiner*—Tim Phan
(74) *Attorney, Agent, or Firm*—Patrick S. Yoder; Alexander M. Gerasimow

(57) ABSTRACT

A technique for separating the stator leads of an electric motor during the manufacturing process. The technique comprises a system having a lead gathering assembly, a lead separator, and a drive mechanism. The lead gathering assembly is adapted to gather together a plurality of stator windings extending from a stator. The lead separator having a plurality of teeth adapted to separate a stator winding from the plurality of stator windings gathered together by the lead gathering assembly. The drive mechanism is adapted to drive the lead separator into the plurality of stator windings. The lead separator has teeth to separate each of the stator windings gathered together by the lead gathering assembly.

18 Claims, 5 Drawing Sheets

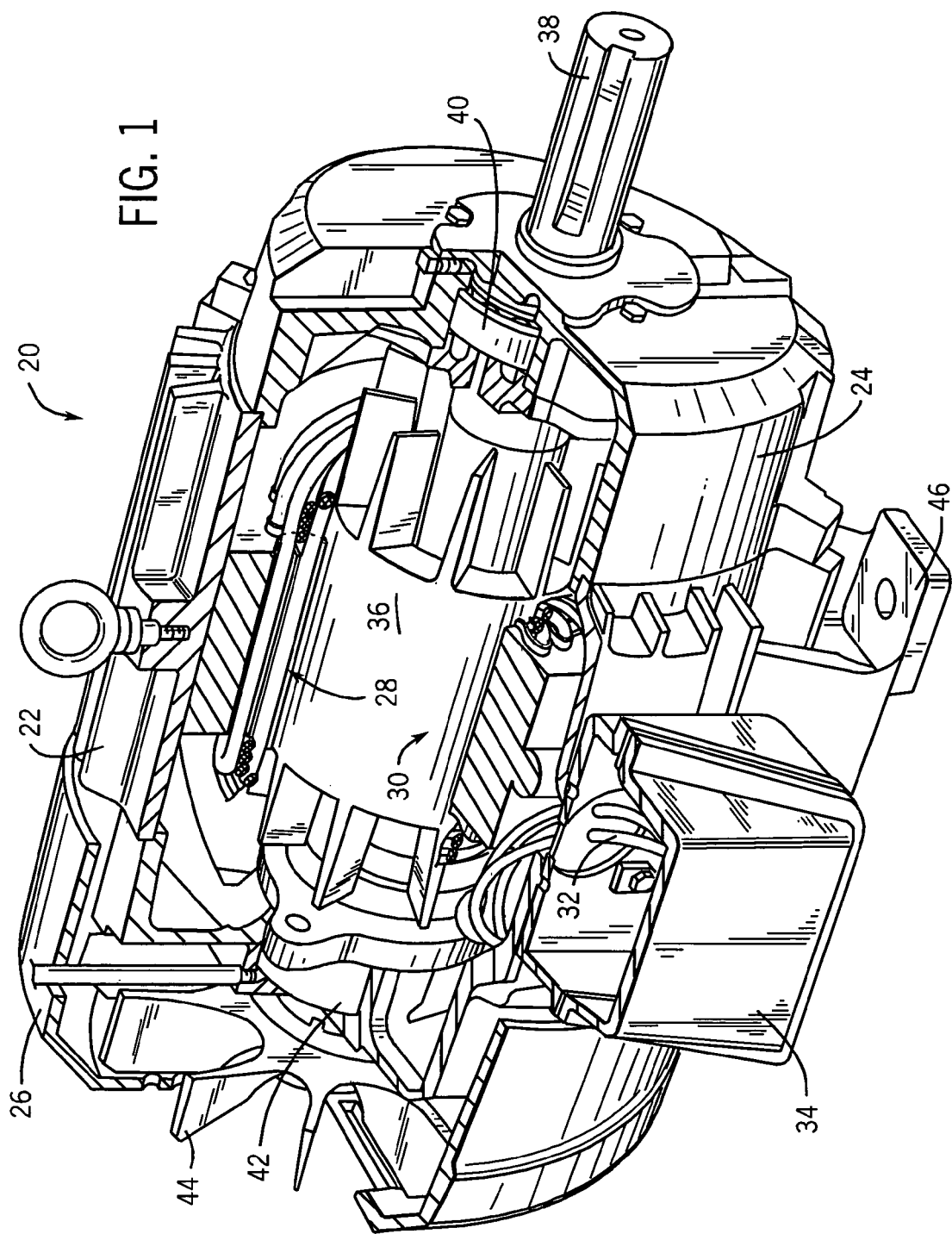

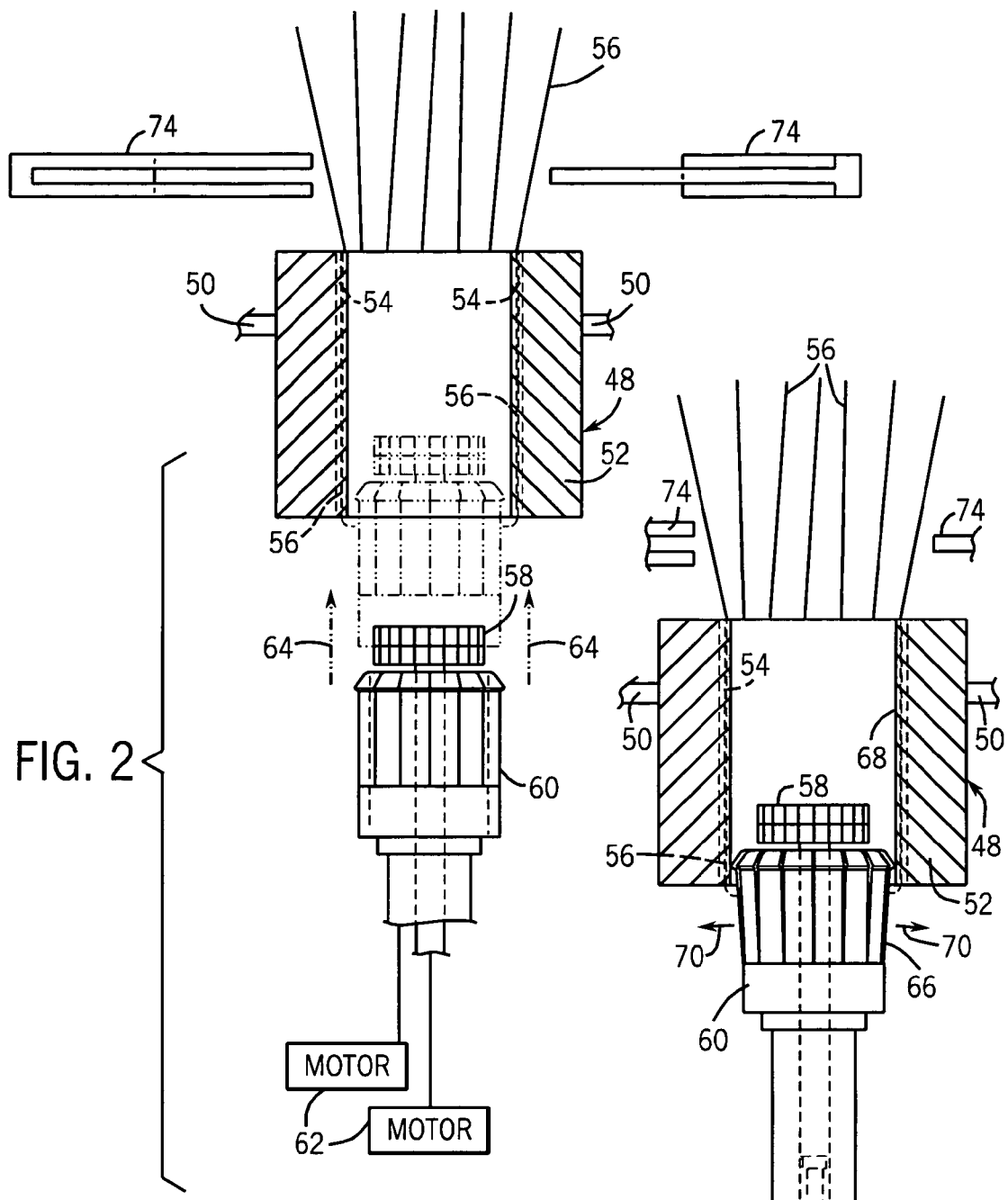

METHOD FOR SEPARATING STATOR WINDINGS OF AN ELECTRIC MOTOR DURING MANUFACTURE

CROSS-REFERENCE TO RELATED APPLICATION

This application is a divisional of Application No. 09/967,364, filed on Sep. 28, 2001, now U.S. Pat. No. 6,722,016.

BACKGROUND OF THE INVENTION

The present invention relates generally to the field of electric motors and methods and apparatus for manufacturing electric motors. More particularly, the invention relates to a novel technique for separating stator winding conductors of a randomly wound stator.

Electric motors of various types are omnipresent in industrial, commercial and consumer settings. In industry, such motors are employed to power all types of rotating machinery, such as pumps, conveyors, compressors, fans and so forth, to mention only a few. Conventional alternating current electric motors may be constructed for single or multiple phase operation, and are typically specifically designed to operate at predetermined synchronous speeds, such as 3600 rpm, 1800 rpm, 1200 rpm and so on. Such motors generally include a stator, comprising a multiplicity of coils, surrounding a rotor which is supported by bearings for rotation in the motor frame. In the case of AC motors, alternating current power applied to the motor causes the rotor to rotate within the stator at a speed which is a function of the frequency of alternating current input power and of the motor design (i.e., the number of poles defined by the motor windings and rotor resistance). In DC motors power is similarly applied, and the speed of the motor may be controlled in a variety of manners. In both cases, however, a rotor shaft extends through the motor housing and is connected to elements of the machinery driven by the electric motor.

In conventional electric motors, conductors, known as stator windings, are routed through parallel slots formed around the inner periphery of a metallic core. The stator windings are electrically connected in groups around the stator core to form electro-magnetic coils. The coils establish the desired electro-magnetic fields used to induce rotation of the rotor. The number and locations of the windings in the stator core generally depends upon the design of the motor (e.g., the number of poles, the number of stator slots, the number of winding groups, and so forth). Each winding coil includes a number of turns of wire that loop around end or head regions of the stator between the slots in which the winding coil is installed. Multiple conductors are wound in each slot in a randomly wound stator. Following installation in the slots, the coils in each group are generally pressed into a bundle at either end of the stator. The stator windings are connected to electrical wiring that is routed from the stator to a wiring or conduit box located on the outside of the motor through corresponding holes in the motor frame and the conduit box.

While conventional motor manufacturing equipment and methods have been generally satisfactory in many applications, they are not without drawbacks. For example, each stator winding must be separated from the other stator windings so that the stator windings may be electrically connected in the proper configuration. Wiring the stator windings in the wrong configuration will decrease the performance of the motor, if the motor is able to operate at all. However, separating the stator windings by hand is time-consuming and increases the cost of manufacturing the motor.

There is a need, therefore, for an improved technique for separating the stator windings of an electric motor after they have been wound on the stator. There is a particular need for a technique that provides the equipment and/or a method for automatically separating the stator windings of an electric motor during the electric motor manufacturing process.

SUMMARY OF THE INVENTION

The invention provides a novel approach to manufacturing an electric motor designed to respond to these needs. The technique can be employed in various motor configurations, including AC and DC motors, and motors configured with 2, 4, 6 or more poles, for single or multiple phase operation, and from fractional horsepowers to very large power ratings.

In accordance with the first aspect of the technique, a system is provided for manufacturing an electric motor. The system comprises a lead gathering assembly, a lead separator, and a drive mechanism. The lead gathering assembly is adapted to gather together a plurality of stator windings extending from a stator. The lead separator has a plurality of teeth adapted to separate a stator winding from the plurality of stator windings gathered together by the lead gathering assembly. The drive mechanism is adapted to drive the lead separator into the plurality of stator windings.

In accordance with another aspect of the technique, a method of manufacturing an electric motor is provided. The method comprises disposing a stator having a plurality of stator leads into a lead separating assembly. The method also comprises gathering the plurality of stator leads together. The method also comprises driving a lead separator into engagement with the plurality of stator leads gathered together to separate each of the plurality of stator leads gathered together.

In accordance with another aspect of the technique, a lead separator for a lead separating system is provided. The lead separator comprises a plurality of teeth disposed around the lead separator. The teeth are adapted to separate individual stator leads from among a plurality of stator leads and direct the stator leads towards a desired location.

BRIEF DESCRIPTION OF THE DRAWINGS

The foregoing and other advantages and features of the invention will become apparent upon reading the following detailed description and upon reference to the drawings in which:

FIG. 1 is a perspective view of an electric motor illustrating the various functional components of the motor including a rotor and a stator, in accordance with certain aspects of the invention;

FIG. 2 is an elevational view of a stator having a plurality of stator winding conductors and a portion of a device for separating the stator winding conductors, illustrating the insertion of a clamp/expander and lead separator into the stator;

FIG. 3 is an elevational view of a stator having a plurality of stator winding conductors and a portion of a device for separating the stator winding conductors, illustrating the expansion of the clamp/expander to secure the clamp/expander and lead separator to the stator;

DETAILED DESCRIPTION OF SPECIFIC EMBODIMENTS

Figure 4:
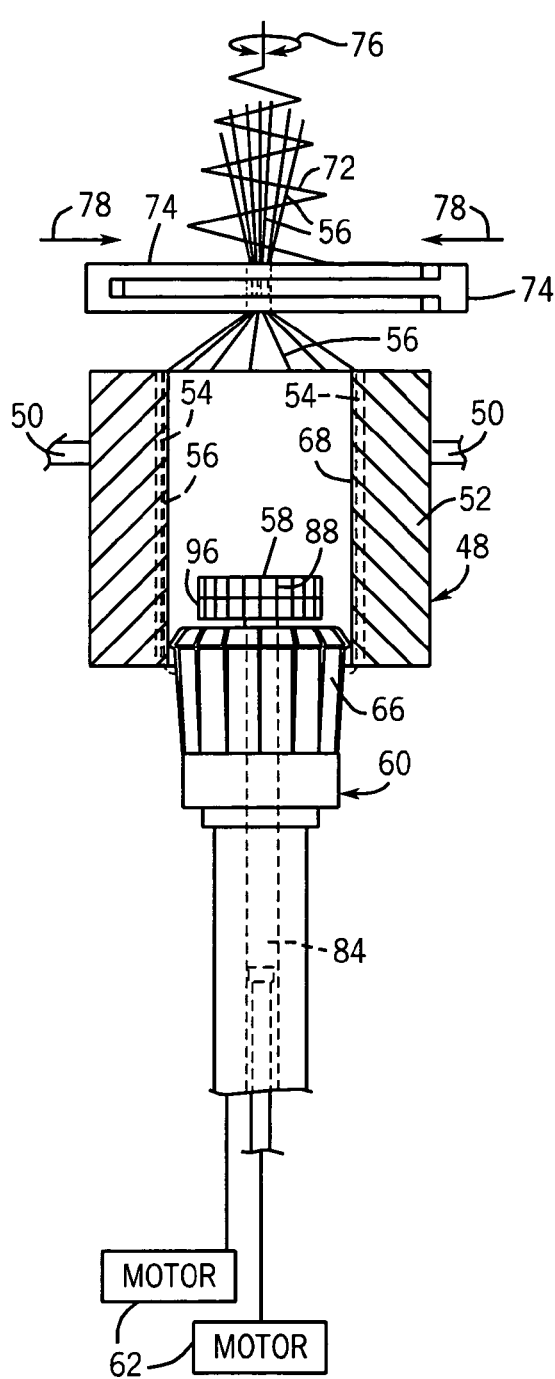
FIG. 4 is an elevational view of a stator having a plurality of stator winding conductors and the device for separating the stator winding conductors, illustrating the operation of the device in collecting the stator winding conductors into a bundle.

Turning now to the drawings, and referring first to FIG. 1, an electric motor is shown and designated generally by the reference numeral 20. In the embodiment illustrated in FIG. 1, motor 20 is an induction motor housed in a conventional NEMA enclosure. Accordingly, motor 20 includes a frame 22 open at front and rear ends and capped by a front end cap 24 and a rear end cap 26. The frame 22, front end cap 24, and rear end cap 26 form a protective shell, or housing, for a stator assembly 28 and a rotor assembly 30. Stator windings are electrically interconnected to form groups, and the groups are, in turn, interconnected. The windings are further coupled to terminal leads 32. The terminal leads 32 are used to electrically connect the stator windings to an external power cable (not shown) coupled to a source of electrical power. Energizing the stator windings produces a magnetic field that induces rotation of the rotor assembly 30. The electrical connection between the terminal leads and the power cable is housed within a conduit box 34.

In the embodiment illustrated, rotor assembly 30 comprises a cast rotor 36 supported on a rotary shaft 38. As will be appreciated by those skilled in the art, shaft 38 is configured for coupling to a driven machine element (not shown), for transmitting torque to the machine element. Rotor 36 and shaft 38 are supported for rotation within frame 22 by a front bearing set 40 and a rear bearing set 42 carried by front end cap 24 and rear end cap 26, respectively. In the illustrated embodiment of electric motor 20, a cooling fan 44 is supported for rotation on shaft 38 to promote convective heat transfer through the frame 22. The frame 22 generally includes features permitting it to be mounted in a desired application, such as integral mounting feet 46. As will be appreciated by those skilled in the art, however, a wide variety of rotor configurations may be envisaged in motors that may employ the manufacturing techniques outlined herein, including wound rotors of the type shown, permanent magnet rotors, and so forth.

Electric motors are typically manufactured using an assembly line process. In one part of the process of manufacturing a randomly wound motor, multiple stator windings are placed in slots along the length of the stator. Referring generally to FIGS. 2–9, a process of separating the multiple stator windings in each slot for further manufacturing steps, such as stator winding identification, labeling, and routing, is illustrated.

Referring generally to FIG. 2, a stator 48 secured to a pallet 50 is illustrated. The pallet 50 is used to handle the stator 48 through a variety of manufacturing steps. The stator 48 includes a core 52 having slots 54 around the inner periphery of the core 52. In the illustrated embodiment, the stator windings 56 are wound on the core 52 with a plurality of stator windings 56 located in each slot 54 within the core 52 of the stator 48. In this view, the stator windings 56 are routed upward for connection to the terminal leads 32 (not shown). In the illustrated embodiment, the stator windings 56 extended freely from the stator 48 and are not physically separated from each other. A lead separator 58 is used to separate each stator winding 56 from the other stator windings. A clamp/expander 60 is used to maintain the lead separator engaged 58 against the stator windings 56.

The lead separator 58 and clamp/expander 60 are raised into the stator core 52 by one or more motorized systems 62, as represented by the arrow 64. The motorized systems 62 may include electric motors, hydraulic motors, servos, etc. The motorized systems 62 also are operable to position the lead separator 58 relative to the clamp/expander 60. The clamp/expander 60 may be de-coupled from the motorized systems 62 to enable the clamp/expander 60 to be transported with the stator 28 to another location for further manufacturing.

Referring generally to FIG. 3, the motorized systems 62 also are operable to secure the clamp/expander 60 to the core 52 of the stator 48. In the illustrated embodiment, arms 66 of the clamp/expander 60 are driven outward against an interior surface 68 of the stator 48, as represented by the arrow 70. The clamp/expander 60 has a locking mechanism (not shown) that maintains the arms 64 of the clamp/expander 60 locked against the interior surface 68 of the stator 48, clamping the clamp/expander 60 to the core 52. The locking mechanism is operable to maintain the clamp/expander 60 engaged against the stator 48 so that the clamp/expander 60 and the lead separator 58 may be disengaged from the motorized systems 62, yet remain secured to the stator 48.

Figure 6:
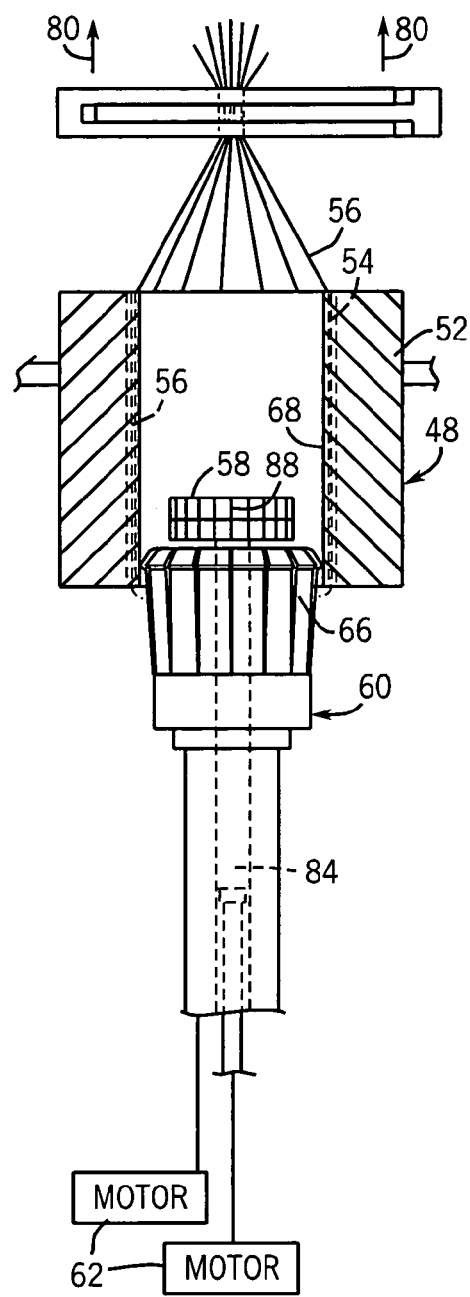
FIG. 6 is an elevational view of a stator having a plurality of stator winding conductors and a portion of the device for separating the stator winding conductors, illustrating the operation of the device in applying tension to the stator winding conductors in the bundle.
Figure 5:
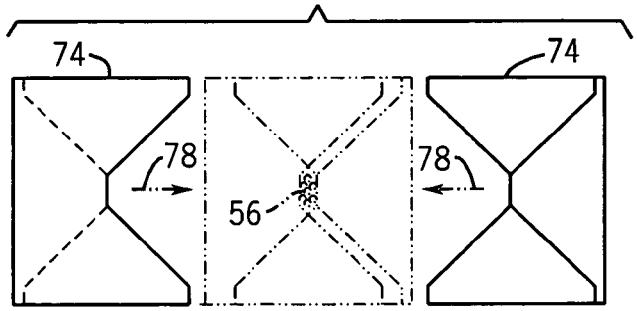
FIG. 5 is a top view of a portion of the device for separating the stator winding conductors, illustrating the operation of the portion of the device in securing the stator winding conductors into a bundle.

Referring generally to FIG. 4, a spiral auger 72 and a clamp 74 are used to secure the stator windings 56 into a bundle. The spiral auger 72 is placed over the loose stator windings 56. The spiral auger 72 is then rotated, as represented by the arrow 76. The spiral auger 72 grabs the stator windings 56 as the spiral auger 72 is rotated, winding the stator windings 56 into a bundle. As best illustrated in FIG. 5, the clamp 74 is then closed onto the bundle of stator windings 56, as represented by the arrows 78. The spiral auger 72 may then be removed without the bundle of stator windings 56 unraveling. The spiral auger 72 is removed by rotating the spiral auger 72 in the opposite direction of rotation. Referring generally to FIG. 6, the clamp 74 is then raised, in this view, to draw the stator windings 56 taut, as represented by the arrows 80. Applying tension to the stator windings 56 removes the slack from the stator windings 56 so that the stator windings 56 may be more easily separated.

Figure 7:
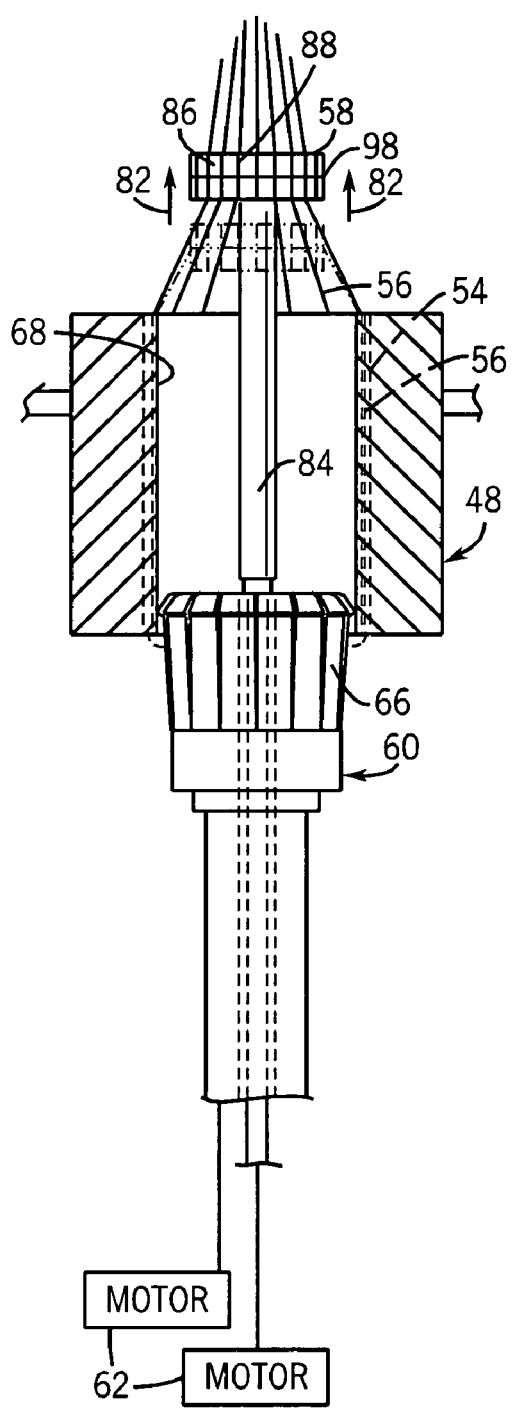
FIG. 7 is an elevational view of a stator having a plurality of stator winding conductors and a portion of the device for separating the stator winding conductors; illustrating the operation of the lead separator in separating individual stator winding conductors from the bundle of stator winding conductors.
Figure 8:
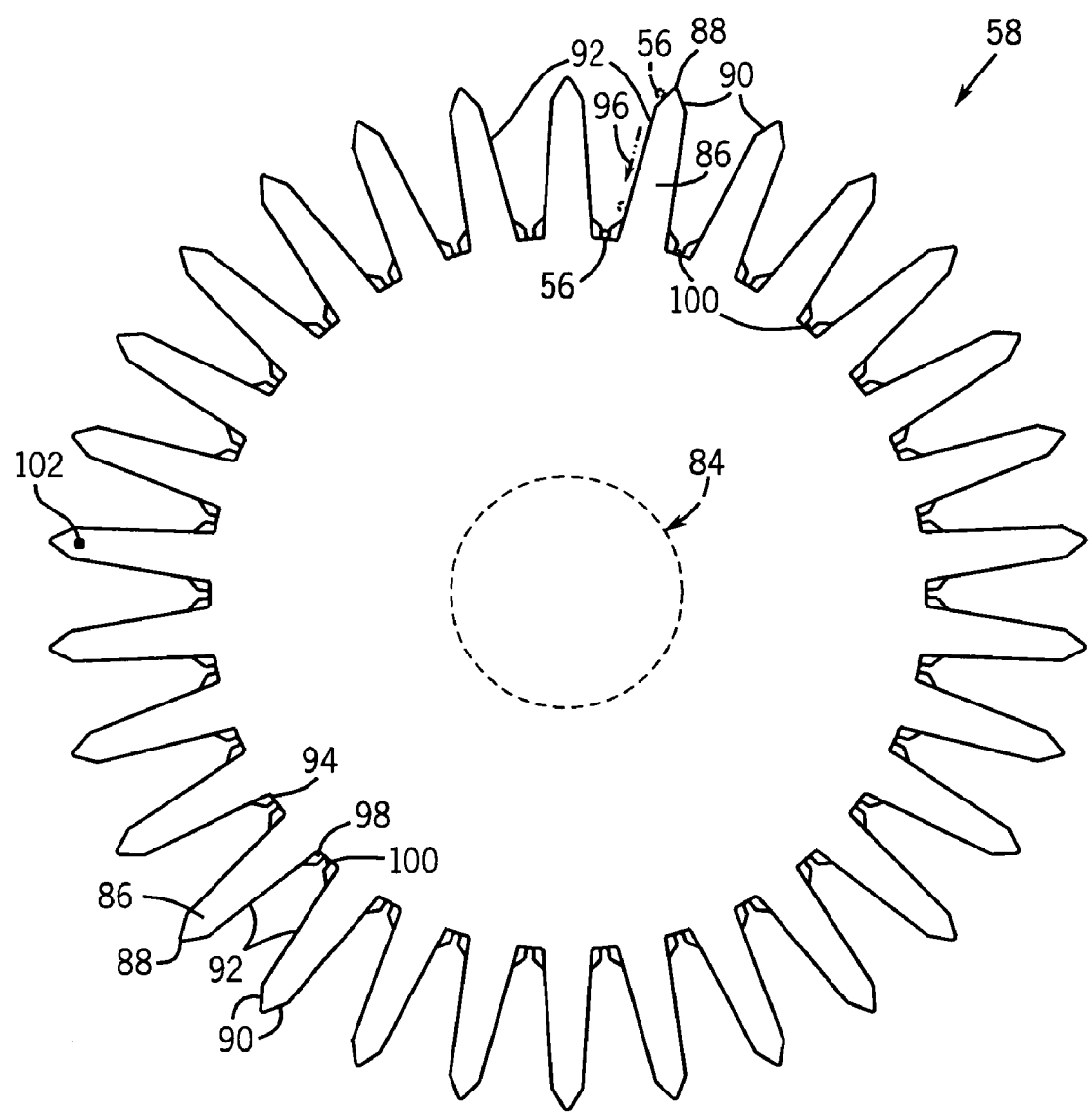
FIG. 8 is a top view of the lead separator.

Referring generally to FIG. 7, one or more motor systems 64 are then used to drive the lead separator 58 upward through the stator 48, as represented by the arrows 82. The lead separator 52 has a shaft 84 that enables the lead separator 58 to be positioned relative to the clamp/expander 60. As best illustrated in FIG. 8, the lead separator 58 has a plurality of teeth 86 extending around the circumference of the lead separator 58. In the illustrated embodiment, each tooth 86 has a point 88 formed by two angled surfaces 90. The points 88 of the tooth 86 are used to separate the stator windings 56 as the lead separator 58 is raised into contact with the cone of stator windings 56. Additionally, each tooth has a second pair of surfaces 92. As the lead separator 58 is raised higher, the angled surface 90 and the second pair of surfaces 92 direct the stator windings toward an inner portion 94 as represented by the arrow 96. The inner portion 94 of the lead separator 58 has a layer of flexible material 98, such as rubber. The flexible material 98 has a slot 100. Each of the stator windings 56 is directed into one of the slots 100. The slots 100 capture the stator windings 56, restraining the movement of the stator windings 56. The stator windings 56 may now be electrically connected in the desired configuration.

Additionally, the lead separator 58 and clamp/expander 60 are adapted so that the stator 48 and pallet 50 may be removed, along with the lead separator 58 and clamp/expander 60, and moved to another assembly station for further assembly. The lead separator 58 and clamp/expander 60 also are operable to maintain the lead separator 58 extended when the lead separator 58 and clamp/expander 60 are disengaged from the motorized systems 62. A reference mark 102 is used to enable a specific stator winding to be marked as a reference point. In the illustrated embodiment, a dot is placed on one of the teeth to serve as a reference mark 102. However, each winding also may be individually marked, such as by placing numbers around the lead separator to mark each stator winding or slot.

Figure 9:
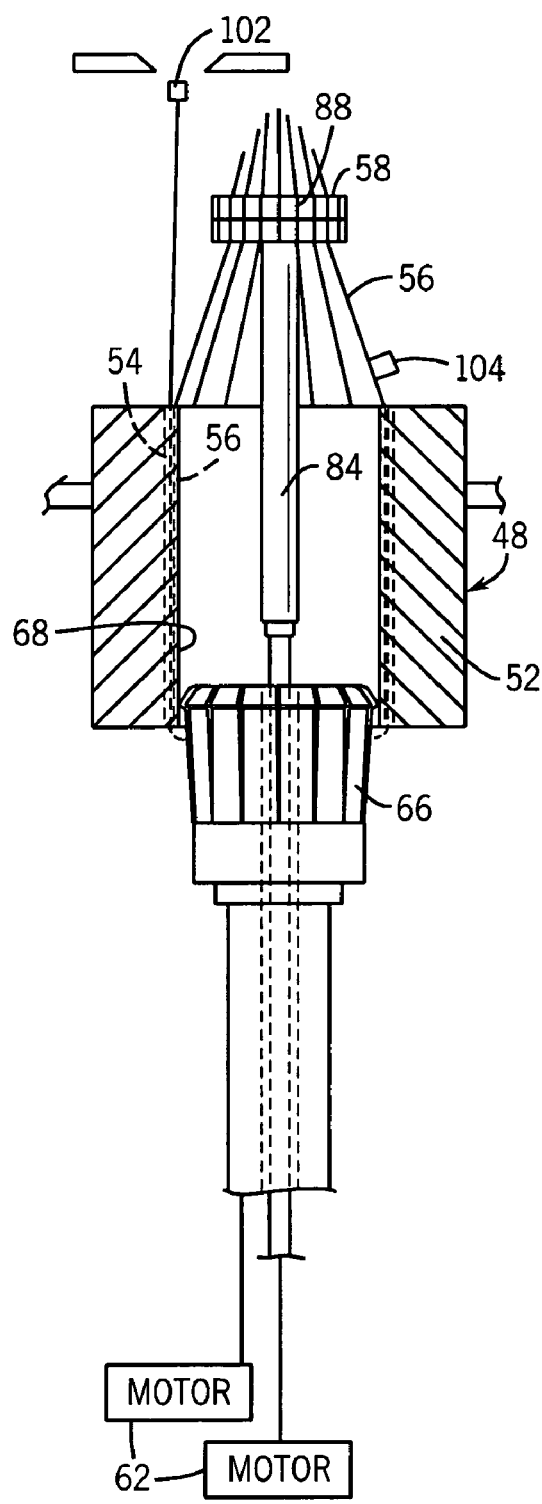
FIG. 9 is an elevational view of a stator having a plurality of individually separated stator winding conductors, illustrating the identification of each of the stator winding conductors.

Referring generally to FIG. 9, each stator winding may now be identified by its position around the circumference of the lead separator 58. The core 52 may have a mark to identify a specific stator winding as a reference point. For example, placing an identifier 104 on a stator winding, as illustrated in FIG. 9, may be performed to identify a specific stator winding 56. Additionally, the labeling, or other processing, may be performed at a different station by moving the pallet 50 and, thus, the stator 48, lead separator 58, and clamp/expander 60 to a different manufacturing station. The movement of the pallet 50 may be performed manually or through the use of a motorized system.

The above technique enables the stator windings of an electric motor to be separated by machine, rather than manually. Additionally, the technique enables the stator windings to be maintained separated during portions of the electric motor manufacturing process, including during movement of the stator. The above technique also enables specific stator windings to be located.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of manufacturing an electric motor, comprising:
    disposing a stator already having a plurality of inserted stator leads into a lead separating assembly, the leads extending beyond the stator from windings installed in stator slots;
    gathering the plurality of stator leads together into a bundle; and
    driving a lead separator through the stator into engagement with the plurality of stator leads gathered together to separate each of the plurality of stator leads gathered together.

2. The method as recited in claim 1, wherein disposing comprises securing the stator to a pallet adapted to position the stator within a stator lead separating device.

3. The method as recited in claim 1, wherein the plurality of stator leads extend freely from the stator.

4. The method as recited in claim 3, wherein gathering comprises placing the plurality of stator leads extending freely from the stator into a lead collector and rotating the lead collector to wind the stator leads together.

5. The method as recited in claim 1, wherein gathering comprises securing a clamp to the plurality of stator leads gathered together.

6. The method as recited in claim 5, wherein gathering comprises utilizing the clamp to apply tension to the plurality of stator leads gathered together.

7. The method as recited in claim 1, wherein driving comprises utilizing a motorized apparatus to drive the lead separator through the stator.

8. The method as recited in claim 1, further comprising providing a lead separator with a plurality of outwardly extending teeth disposed circumferentially around the lead separator, wherein each tooth is adapted to penetrate the plurality of stator leads gathered together and to separate each the plurality of stator leads gathered together.

9. The method as recited in claim 8, wherein providing comprises providing a lead separator adapted to individually restrain each of the plurality of stator leads gathered together.

10. The method as recited in claim 9, wherein the plurality of teeth cooperate to direct each of the plurality of stator leads towards flexible material disposed between pairs of teeth.

11. The method as recited in claim 8, wherein providing comprises identifying the number of stator leads in the plurality of stator leads and providing a lead separator with the same number of teeth as the number of stator leads.

12. The method as recited in claim 1, further comprising securing the lead separator to a stator clamp secured to the stator to maintain each stator lead separated.

13. The method as recited in claim 12, further comprising removing the stator, stator clamp, and lead separator from the lead separating device for movement to another electric motor manufacturing device.

14. A method of manufacturing an electric motor, comprising:
    disposing a stator having a plurality of stator leads into a lead separating assembly, the plurality of stator leads extending freely from the stator;
    gathering the plurality of stator leads together into a bundle by placing the plurality of stator leads extending freely from the stator into a lead collector and rotating the lead collector to wind the stator leads together; and
    driving a lead separator through the stator into engagement with the plurality of stator leads gathered together to separate each of the plurality of stator leads gathered together.

15. The method as recited in claim 14, wherein gathering comprises securing a clamp to the plurality of stator leads gathered together.

16. The method as recited in claim 15, wherein gathering comprises utilizing the clamp to apply tension to the plurality of stator leads gathered together.

17. The method as recited in claim 14, wherein driving comprises utilizing a motorized apparatus to drive the lead separator through the stator.

18. The method as recited in claim 14, further comprising providing a lead separator with a plurality of outwardly extending teeth disposed circumferentially around the lead separator, wherein each tooth is adapted to penetrate the plurality of stator leads gathered together and to separate each the plurality of stator leads gathered together.

* * * * *